United States Patent [19]
Gautier et al.

[11] Patent Number: 5,921,084
[45] Date of Patent: Jul. 13, 1999

[54] POWER-ASSISTED BRAKING DEVICE WITH A VARIABLE ASSISTANCE RATIO

[75] Inventors: Jean Pierre Gautier, Aulnay-Sous-Bois, France; Fernando Sacristan, Sant Cugat Des Valles; Juan Simon Bacardit, Barcelone, both of Spain; Jean Marc Attard, Chantilly, France; Ulysse Verbo, Aulnay-Sous-Bois, France; Stephane Lacroix, Tournan en Brie, France

[73] Assignee: Robert Bosch Technology Corporation, Broadview, Ill.

[21] Appl. No.: 08/849,588

[22] PCT Filed: May 14, 1997

[86] PCT No.: PCT/FR97/00852

§ 371 Date: May 28, 1997

§ 102(e) Date: May 28, 1997

[87] PCT Pub. No.: WO98/03385

PCT Pub. Date: Jan. 29, 1998

[30] Foreign Application Priority Data

Jul. 23, 1996 [FR] France ................................. 9609242

[51] Int. Cl.[6] .................................................. B60T 13/20
[52] U.S. Cl. ............................................................. 60/553
[58] Field of Search ............................... 60/552, 553, 574

[56] References Cited

U.S. PATENT DOCUMENTS 2,959,011  11/1960  Randol ........................................ 60/553
3,387,455  6/1968  Eggstein .................................... 60/553

Primary Examiner—F. Daniel Lopez
Attorney, Agent, or Firm—Leo H. McCormick, Jr.; Warren Comstock

[57] ABSTRACT

A boosted braking device for a motor vehicle having a master cylinder (200) and a pneumatic booster (100) operated by applying an input force to an operating rod (26). The booster (100) has a rigid casing (10) which is divided by a partition (16) into at least first (12) and second (14) leaktight chambers. The partition (16) is acted upon via a difference in pressure between the first (12) and second (14) chambers on the opening of a three-way valve (24) to allow pressurized fluid to be communicated to the second chamber (14). A main hydraulic piston (30) which is located in the master cylinder (200) has a hollow cylinder (32) which is in communication with an interior volume (V) of the master cylinder (200). A secondary hydraulic piston (34) slides in a leaktight fashion inside of the hollow cylinder (32). The secondary hydraulic piston (34) includes a two-way valve (56) which is normally open but interrupts communication between the interior volume (V) of the master cylinder (200) and an interior volume (35) in the hollow cylinder (32) when a variation in an input force is greater than a predetermined value. The secondary hydraulic piston (14) is composite and includes a first part (50) and a second part (52). In a rest position, the first part (50) abuts the hollow cylinder (32) under the effects of a first elastic force from a first elastic member (46) while the second part (52) is capable of sliding with respect to and abut the first part (50) under the effects of a second elastic force from a second elastic member (54,92).

19 Claims, 4 Drawing Sheets

POWER-ASSISTED BRAKING DEVICE WITH A VARIABLE ASSISTANCE RATIO

The present invention relates to boosted braking devices for motor vehicles, comprising a master cylinder controlling the hydraulic pressure in the brake circuit connected to the brakes of the vehicle, this master cylinder being capable of being actuated by a pneumatic booster when the driver of the vehicle depresses the brake pedal.

BACKGROUND OF THE INVENTION

In the conventional way, the master cylinder is filled with brake fluid and equipped with a main hydraulic piston intended to receive an actuating force composed of an input force and of a boost force both acting in an axial direction.

Furthermore, the pneumatic booster is capable of being operated by applying the input force to an operating rod controlling the opening of a valve in order to exert the actuating force on the main hydraulic piston of the master cylinder, the booster including a rigid casing divided in leaktight fashion into two chambers by means of a moving partition capable of being acted upon by a difference in pressure between the two chambers resulting from the opening of the valve and of driving along a pneumatic piston which can move with respect to the casing and carries the valve, the input force being transmitted via a reaction disc on which the pneumatic piston also presses in order to provide it with at least some of the boost force.

A device of this type is well known in the prior art and is described, for example, in document U.S. Pat. No. 4,491,058.

These braking devices have, by way of advantage, and as a result of the use of a pneumatic piston which can move with respect to the rigid casing, the fact that the total travel available for the operating rod and therefore for the brake pedal, is relatively long, and this constitutes a condition which needs to be satisfied in order to ensure optimum control of the deceleration of the vehicle under braking.

However, in cases of sharp braking intended to relieve an emergency situation, these braking devices have the major drawback that in order to obtain a relatively high pressure in the brake circuit, they need a brake pedal travel which is substantially longer than that required to obtain the same pressure in the circuit during braking under normal conditions when the emergency nature of the braking is less of an issue.

Given the urgency of the braking, the driver is not always aware of this lengthened travel of the brake pedal, because he presses down on it with rapidly varying substantial force in order to obtain the braking effect required by this emergency situation.

Braking systems have therefore been developed which include various sensors which are sensitive to the force applied to the brake pedal and/or to the rate of application of this force so as to correct, using a pneumatic solenoid valve operated by a microprocessor receiving the signals from these sensors, the pressure difference prevailing in the booster in order to make it increase more rapidly so as also to increase the boost force more rapidly and therefore correct the lengthening of the response time of the booster by increasing the boost force.

However, although the sensors and the microprocessor have very short response times, the mechanical components on which the sensors are fitted have relatively high inertia or response time which means that the electronic correction system does not come into play until a relatively long time after the emergency situation has been detected.

In parallel, boosted braking devices have been developed in which the reaction exerted on the operating rod is no longer provided mechanically by a reaction disc but by the hydraulic pressure prevailing in the master cylinder.

In these devices, the main hydraulic piston of the master cylinder itself includes a hollow moving cylinder communicating with the master cylinder and receiving at least some of the boost force, and inside which there slides in leaktight fashion and in the axial direction a secondary hydraulic piston capable of receiving at least the input force, elastic means exerting an elastic force between the secondary hydraulic piston and the moving cylinder and urging the secondary hydraulic piston in the direction of the master cylinder, at least one opening being made in the moving cylinder so as to make the interior of the latter communicate with the interior of the master cylinder.

Such a device is described, for example, in document FR-A-2,658,466.

These devices with hydraulic reaction have as their main advantage the fact that however intense the braking action and however great the rate of application of the input force, their characteristic operating curve, namely the curve giving the pressure in the master cylinder as a function of the intensity of the input force of the booster, is unchanged. These devices therefore show no lengthening in the response time in the case of emergency braking.

The fact of equipping these hydraulic reaction devices with sensors for detecting emergency situations and with a pneumatic solenoid valve for increasing the pressure in the rear chamber of the booster thus yields a clear advantage by comparison with devices having mechanical reaction, because it plays a part in improving the normal operating curve of the booster, rather than seeking to correct a degraded operating curve.

SUMMARY OF THE INVENTION

The present invention falls within this context, and its object is to propose a boosted braking device with hydraulic reaction which has improved operating characteristics in the case of emergency braking, without requiring sensors or a complicated electronic circuit, and which is therefore of lower cost, while operating reliably under all circumstances.

To this end, the present invention proposes a boosted braking device for a motor vehicle, comprising on the one hand a master cylinder filled with a brake fluid and equipped with a main hydraulic piston intended to receive an actuating force composed of an input force and of a boost force both acting in an axial direction, and on the other hand a pneumatic booster which can be operated by applying the input force to an operating rod secured to a plunger controlling the opening of a three-way valve, so as to exert the actuating force on the main hydraulic piston, the booster including a rigid casing divided in leaktight fashion into at least two chambers by means of at least one moving partition which can be acted upon via a difference in pressure between the two chambers resulting from the opening of the three-way valve and of driving along a pneumatic piston which can move with respect to the casing, bearing the three-way valve and contributing at least to transmitting the boost force, the main hydraulic piston of the master cylinder itself including a hollow moving cylinder communicating with the interior volume of the master cylinder, receiving at least part of the boost force, and inside which there slides, in leaktight fashion and in the axial direction, a secondary hydraulic piston capable of receiving at least the input force, first elastic means exerting a first elastic force between the secondary hydraulic piston and the moving cylinder and urging the secondary hydraulic piston in the direction of the master cylinder, at least one opening being made in the moving cylinder in order to make the interior of the latter communicate with the interior of the master cylinder, the secondary hydraulic piston including a two-way valve means which is normally open, capable of interrupting the communication between the interior volume of the master cylinder and the interior of the moving cylinder.

Such a boosted braking device is known, for example, from document EP-B-0,662,894.

According to the present invention, the secondary hydraulic piston is composite and includes a first part which, in the position of rest, is in abutment against the moving cylinder under the effect of the first elastic means, and a second part capable of sliding with respect to the first part, second elastic means exerting a second elastic force backwards on the second part in order to urge it into abutment, in the position of rest, against the first part.

Thanks to this arrangement, upon an emergency braking action, the first and second parts of the secondary hydraulic piston can slide one with respect to the other and actuate the two-way valve means in the direction of closure, so that the secondary hydraulic piston receives the master cylinder internal pressure reaction only on a cross-section which is smaller than that on which it receives this pressure reaction during braking under emergency conditions, this resulting in the boost ratio of the boosted braking device being higher under emergency braking than it is for braking under normal conditions.

Further objectives, features and advantages of the invention will emerge clearly from the description which follows of one embodiment given by way of non-limiting example with reference to the attached drawings.

DETAILED DESCRIPTION OF THE INVENTION

Figure 1:
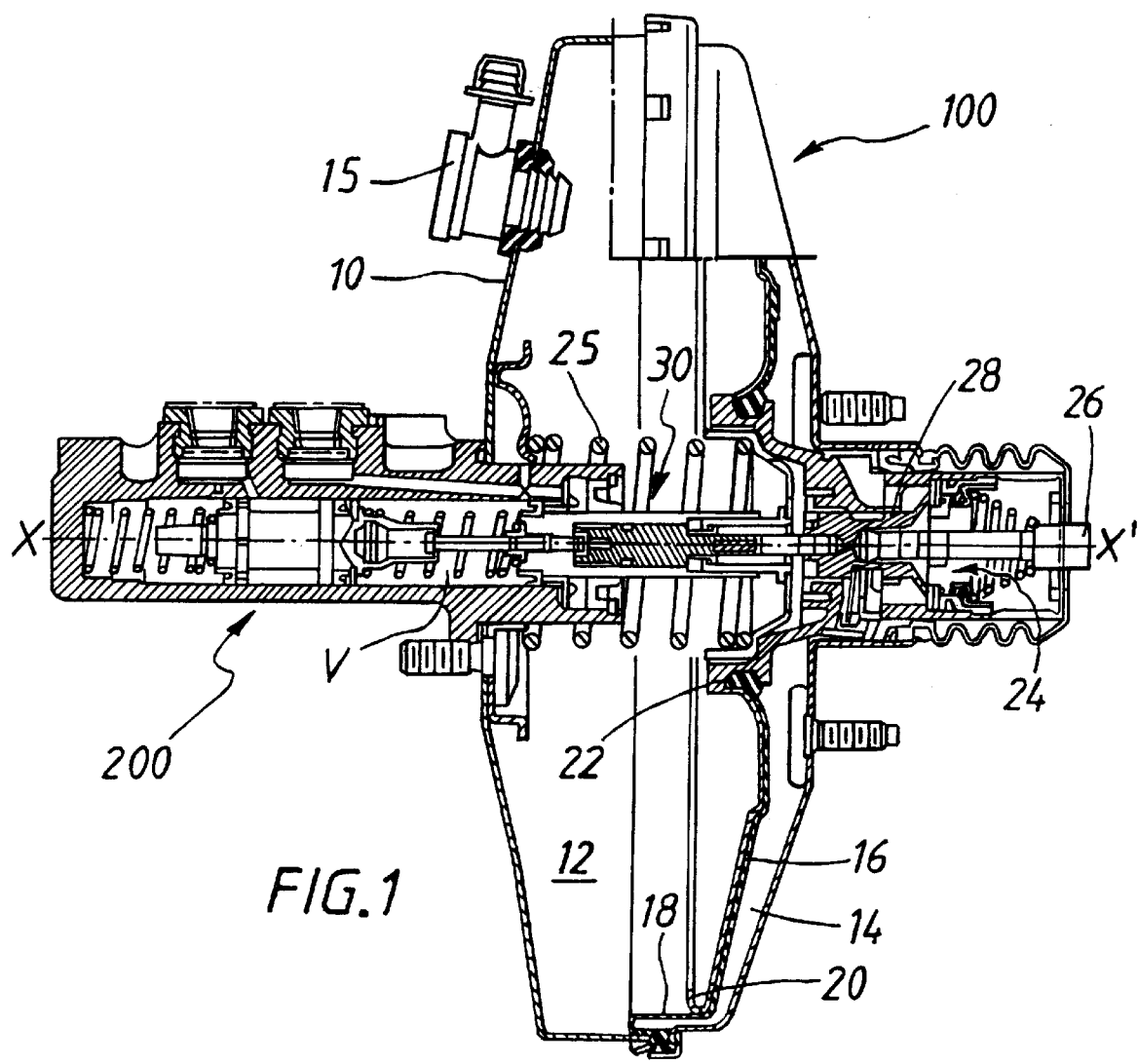
FIG. 1 represents a sectional view of a boosted braking device produced in accordance with the present invention.

Insofar as the invention relates only to an improvement made to pneumatically boosted braking systems, and as the general construction and operation of such systems are well known to the person skilled in the art, they will be recalled here just briefly in order to allow complete understanding of the improvement that the invention represents.

Schematically, a system of this type comprises a booster 100 and a master cylinder 200.

The booster 100 is designed to be fixed in the usual fashion to a bulkhead (not represented) separating an engine compartment of a vehicle from the cockpit of this vehicle and to be actuated by a brake pedal (not represented) situated in this cockpit. The master cylinder 200 operating the hydraulic braking circuit of the vehicle is fixed to the front wall of the booster 100.

By convention, that part of a booster/master cylinder assembly which points towards the master cylinder 200 is called the "front" and that part of this assembly which points towards the brake pedal 12 is called the "rear". In the figures, the front is therefore to the left and the rear to the right.

The booster 100 itself comprises a rigid casing 10, the interior volume of which is divided into a front chamber 12 and a rear chamber 14 in leaktight fashion by a moving partition 16 comprising a membrane 18 and a rigid skirt 20 and is capable of driving along a pneumatic piston 22 which can move inside the casing 10.

The front chamber 12, the front face of which is closed in leaktight fashion by the master cylinder 200 is permanently connected to a source of partial vacuum (not represented) via a connector 15. The pressure in the rear chamber 14 is controlled by a three-way valve 24, operated by an operating rod 26 connected to the brake pedal and secured to a plunger 28.

When the operating rod 26 is in the position of rest, that is to say pulled to the right, the valve 24 establishes a communication between the two chambers 12 and 14 of the booster. As the rear chamber 14 is then subjected to the same partial vacuum as the front chamber 12, the piston 22 is pushed back to the right, to the position of rest, by a spring 25.

Actuating the operating rod 26 towards the left has the effect, first of all, of shifting the valve 24 in such a way that it isolates the chambers 12 and 14 from one another and then, secondly, of shifting this valve in such a way that it opens the rear chamber 14 to atmospheric pressure.

The difference in pressure between the two chambers 12 and 14, which is now felt by the membrane 18, exerts on the moving partition 16 a thrust which tends to shift it towards the left and allow it to drive along the piston 22 which in turn shifts, compressing the spring 25.

The braking effort exerted on the operating rod 26, or "input force" and the brake-boosting effort, or "boost force" resulting from the thrust of the moving partition 16, are then applied together along the axis X–X' of the booster 100 in the direction of the master cylinder 200, and they combine to form the actuating force for the latter.

More specifically, the actuating force is applied to the main hydraulic piston 30 of the master cylinder and causes it to shift to the left (in the figures), and this leads to a rise in pressure of the brake fluid present in the interior volume V of the master cylinder 200, and an actuation of the brake (not represented) connected thereto.

Figure 2:
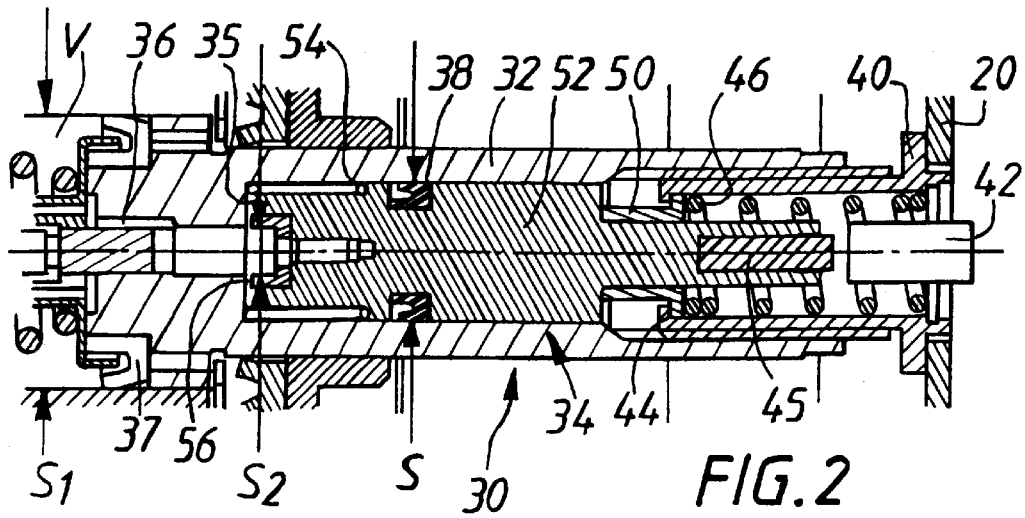
FIG. 2 represents a sectional view on a larger scale of the central part of the device of FIG. 1.

As better seen in FIG. 2, the main hydraulic piston 30 is in fact composite and comprises on the one hand a moving and hollow cylinder 32 and, on the other hand, a secondary hydraulic piston 34.

The interior volume 35 of the hollow moving cylinder 32 communicates with the interior volume V of the master cylinder via openings, such as 36, made in the moving cylinder in an axial direction.

Apart from the passage of fluid permitted by the openings 36 between the interior volume V of the master cylinder 200 and the interior volume 35 of the moving cylinder 32, this moving cylinder 32 slides in leaktight fashion in the body of the master cylinder 200, sealing being obtained thanks to at least one annular lip seal 37.

The secondary hydraulic piston 34, for its part, slides inside the moving cylinder 32, which it closes in leaktight fashion thanks to an annular seal 38.

The moving cylinder 32 is connected, via a ring 40, to the rigid skirt 20 so as to receive at least part of the boost force exerted by this rigid skirt 20.

The secondary hydraulic piston 34 is arranged axially facing a push rod 42 secured to the plunger 28 and capable of transmitting to it at least the input force exerted on the operating rod 26, itself secured to the plunger 28.

The way in which the device described hitherto operates will now be explained.

At rest, the various moving parts occupy the position represented in FIGS. 1 and 2, and in particular the secondary hydraulic piston 34 is in abutment forwards on a radial shoulder 44 of the moving cylinder 32 under the effect of the urging of a spring 46. In the example represented in FIGS. 1 and 2, the shoulder 44 is formed at the front end of the ring 40. The valve 24 allows communication between the two chambers 12 and 14, which are therefore at the same reduced pressure provided by the connector 15.

A first effort on the brake pedal serves to overcome the preload of the spring of the operating rod 26 and to bring the valve 24 into a position in which it isolates the two chambers 12 and 14 from one another. This increase in effort on the brake pedal therefore provides no increase in pressure in the master cylinder, and it is represented on the curve of FIG. 8 by the segment OA.

After this predetermined travel of the operating rod 26, the valve 24 opens the rear chamber 14 of the booster 100 to atmosphere, and a difference in pressures between the two chambers 12 and 14 of the booster becomes established. This pressure difference gives rise to a boost force which moves the rigid skirt 20 and the moving cylinder 32 forwards.

The hydraulic pressure in the internal volume V of the master cylinder 200 therefore rises and becomes established, by hydraulic fluid flowing through the openings 36, in the internal volume 35 of the moving cylinder 32, and is exerted on the cross-section S of the secondary hydraulic piston 34.

First of all, the force generated by this pressure exerted on this cross-section S does not exceed the preload at rest of the spring 46, which means that the secondary hydraulic piston 34 remains immobile with respect to the moving cylinder 32, and some distance from the push rod 42, no reaction therefore being felt on the brake pedal. This first operating phase is represented by the segment AB of the curve of FIG. 8. The length of the segment AB is known as the "jump" of the booster.

The booster jump may be set to any desired value by adjusting the preload at rest of the spring 46. It is possible, for example, and as has been represented in FIGS. 1 and 2, to envisage the ring 40 being threaded and screwed into the moving cylinder 32 to which it transmits at least part of the boost force exerted on the skirt 20 bearing against it.

Screwing the ring 40 into the moving cylinder 32 thus has the effect of compressing the spring 46 and therefore of increasing the preload which the latter exerts on the secondary hydraulic piston 34 in the direction of the master cylinder, that is to say of increasing further the value of the jump.

In order to compensate for the reduction in length which results from screwing the ring 40 into the moving cylinder 32, this ring is, for example, made in two parts screwed together so as to have an adjustable overall length.

It is also possible to envisage the push rod 42 itself being produced in two parts screwed together so as to have an adjustable overall length, adjusting this length especially making it possible to alter the opening of the valve when the jump occurs, irrespective of the value given to this jump by screwing the ring 40 into the moving cylinder 32.

In a second phase of operation, the hydraulic pressure increases in the volumes V and 35 and reaches a predetermined value for which, when applied to the cross-section S, it becomes sufficient to overcome the preload at rest of the spring 46. The secondary hydraulic piston 34 therefore shifts backwards and comes into contact with the push rod 42, as illustrated by the point B of the curve of FIG. 8. It would advantageously be possible to provide a buffer piece 45 made of rubber or some other elastomeric material at the rear of the secondary hydraulic piston 34 and/or at the front of the push rod 42 to deaden the impact of this contact and the resulting noise.

Figure 8:
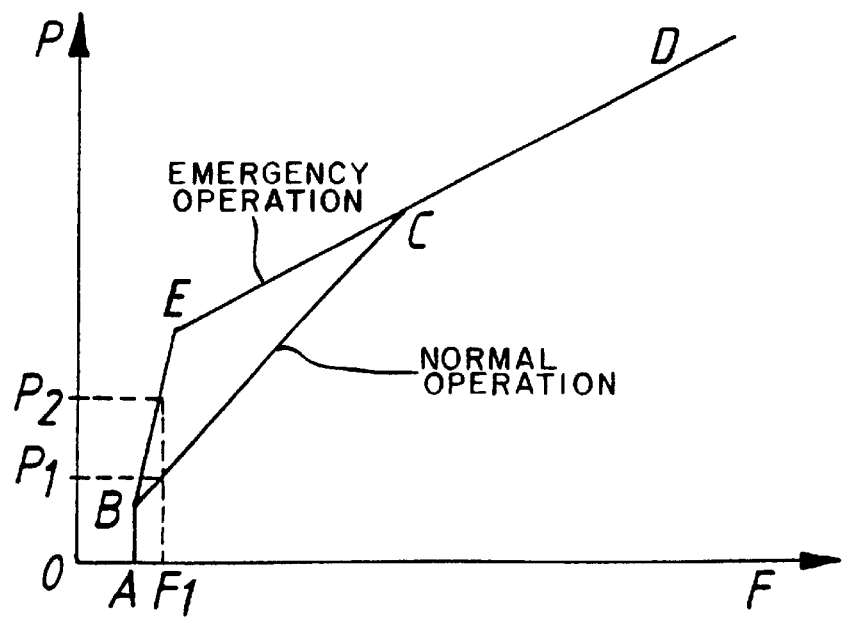
FIG. 8 represents the curve of pressure generated by the master cylinder as a function of the effort applied to the brake pedal, this curve being obtained with the braking device in accordance with the present invention.

The secondary hydraulic piston 34 therefore exerts on the push rod 42 and on the brake pedal a reaction force which depends on the boost force and opposes the input force and therefore allows the first force to be controlled by the second, as has been represented by the segment BC on the curve of FIG. 8. The secondary hydraulic piston 34 therefore constitutes a reaction piston subjected to the hydraulic pressure prevailing in the reaction chamber consisting of the interior volume 35 of the moving cylinder 32.

The slope of this segment BC, which equals the ratio of the output pressure to the input force, represents the boost ratio of the braking device. This boost ratio is also equal to the ratio of the cross-section $S_1$ of the moving cylinder 32 to the cross-section S of the secondary hydraulic piston 34.

The boost force reaches its maximum when the pressure in the rear chamber of the booster reaches atmospheric pressure, and can therefore not increase any further. The phenomenon known by the name of saturation and represented by the segment CD on the curve of FIG. 8 is then reached.

In all these phases of operation, it can be seen especially that apart from the travel of the plunger 28 which is needed to actuate the valve 24 and cause the pressure in the rear chamber 14 to vary, and which corresponds to the segment OA of the curve of FIG. 8, the plunger 28 and the push rod 42 shift with the moving partition 16.

The braking device which has just been described operates in this same way upon each braking action, irrespective of the rate of application of the input force to the operating rod 26, that means both for normal braking where slight deceleration of the vehicle is desired, and for emergency braking where the driver needs to stop his vehicle immediately.

In the latter case, it is of course desirable quickly to obtain a substantial braking effort, that is to say a high pressure in the hydraulic braking circuit. The known solution recalled in the preamble and consisting for example in arranging at least one force sensor on the brake pedal, and in calculating the rate of variation of this force in order therefrom to deduce an emergency situation and activate a solenoid valve in order to vent the rear chamber of the booster directly to atmosphere, is only a partial solution because it produces its effects only after a certain amount of delay.

The present invention makes it possible to achieve this result, that is to say immediately to obtain a high braking pressure in the event of emergency braking, using means which are simple and effective and the response time of which is minimal.

As better seen in FIG. 2, the reaction piston 34 is itself composite. It includes a first part 50 which, in the position of rest, is in abutment on the moving cylinder 32 under the effect of the urging from the spring 46. It also includes a second part 52 which is capable of sliding inside the first part 50.

The second part 52 is in abutment towards the rear in the position of rest on the first part 50 under the effect of the urging of a second spring 54 arranged between shoulders of the moving cylinder 32 and of this second part 52. The second spring 54 has a preload at rest which is lower than that of the spring 46.

The second part 52 slides in leaktight fashion in the moving cylinder 32 thanks to an annular seal 38, as was described earlier. It is furthermore equipped with a member for closing off the axial opening 36 made in the moving cylinder 32.

According to the embodiment of FIG. 2, this closing member consists of an annular seal 56 arranged on the front face of the second part 52 facing the axial opening 36. It is also possible to envisage the annular seal 56 being arranged on the moving cylinder 32, at the edge of the axial opening 36.

When an effort is applied to the brake pedal for a braking action for which just normal slowing-down of the vehicle is desired, the assembly which has just been described operates as was explained earlier. The first and second phases of operation effectively progress as was described, the first and second parts shifting together towards the rear when the hydraulic pressure in the reaction chamber 35 increases.

The characteristic operating curve of the braking device therefore conforms to the curve of FIG. 8, passing through the points O, A, B, C and D.

In contrast, upon a braking action under emergency conditions, that is to say when the input effort on the brake pedal increases very rapidly in order to reach a very high value, the plunger 28 and the push rod 42 advance very rapidly, and in particular they advance with respect to the rigid skirt 20, the difference in pressures between the front and rear chambers not having had time to become established and to move the moving partition 16. This phenomenon has two important consequences.

On the one hand, the additional forwards movement of the plunger 28 causes greater opening of the valve 24, which allows a more rapid pressure rise in the rear chamber 14.

On the other hand, at the same time, the push rod 42 comes into contact with the second part 52 and causes it to slide forwards in the first part 50, compressing the spring 54, and without compressing the spring 46 which then has the sole effect of keeping the first part 50 bearing on the radial shoulder 44. In this movement, the annular seal 56 closes the axial passage 36 so that the volume of the reaction chamber is thus reduced to the volume defined by the annular seal 56.

It follows that the hydraulic pressure in the volume V of the master cylinder is exerted on the second part 52 on its cross-section $S_2$ defined by the inside diameter of the annular seal 56. The result of this is therefore that the boost ratio under these emergency braking conditions is equal to the ratio of the cross-section $S_1$ of the moving cylinder 32 to the cross-section $S_2$ of the second part 52 of the secondary hydraulic piston 34 on which cross-section the hydraulic pressure is exerted.

As the cross-section $S_2$ is smaller than the cross-section S of the second part 52, this therefore means that under emergency braking conditions, the boost ratio is greater than the one obtained under normal braking conditions. The operation of the braking device is therefore represented by the segment BE on the curve of FIG. 8.

It may thus be seen that for the same instantaneous input effort $F_1$, an instantaneous pressure $P_2$ which is appreciably higher than the instantaneous pressure $P_1$, obtained under normal braking conditions is obtained. What is more, as the boost ratio is higher, the phenomenon of saturation represented by the point E is reached earlier.

This second boost ratio may be chosen at will, and given any desired value, particularly a high value, by selecting low values for the diameters of the annular seal 56 and of the opening 36. The opening 36 does, however, need to have a diameter big enough to allow the hydraulic pressure in the reaction chamber 35 to rise under normal operating conditions, without leading to restrictions in communication with the volume V of the master cylinder.

When the driver releases his effort after such an emergency braking action, the effect of the operating rod 26 moving backward again is to move the plunger 28 and the valve 24, and this then places the front and rear chambers back in communication with one another. This therefore results in a backwards movement of the moving partition 16 and of the moving cylinder 32 under the effect of the spring 25, a drop in pressure in the interior volume V of the master cylinder, and a backwards movement of the second part 52 under the effect of the spring 54. The various moving parts thus return to their position of rest illustrated in FIGS. 1 and 2.

Thus, according to the present invention, a boosted braking device has indeed been achieved which has improved operating characteristics in the event of emergency braking because it then has a boost ratio which is markedly higher than the one it has under normal operating conditions. This change in boost ratio is obtained automatically without the need for sensors or for a complicated electronic circuit, simply by exploiting the fact that under these extreme conditions, the plunger 28 and the push rod 42 exhibit a relative movement with respect to the rigid skirt 20. The means used to obtain this result are relatively simple and therefore of lower cost and operate reliably under all circumstances, both under normal operating conditions and under emergency conditions.

FIGS. 3 to 7 represent various alternative forms of the boosted braking device which has just been described. In these figures, the same elements are given the same reference symbols.

Figure 3:
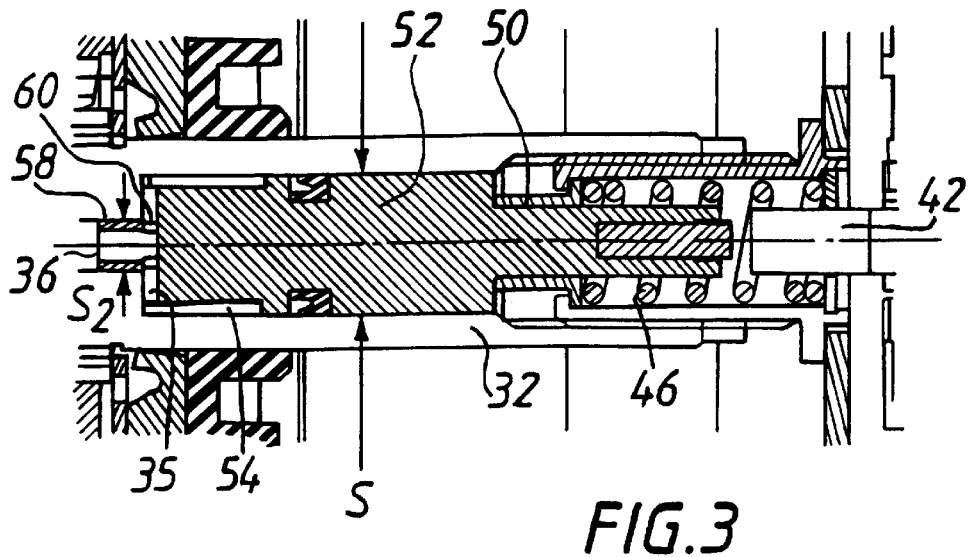
FIG. 3 represents a sectional view of a first alternative form of the central part of the braking device of FIG. 1.

It may seen in FIG. 3 that the member for closing the opening 36, this member being borne by the second part 52, is the only thing to have been modified by comparison with the embodiment of FIG. 2. In this alternative form, the second part 52 is formed at its front end with a hollow axial extension 58 sliding in almost leaktight fashion in the opening 36. The extension 58 is, in addition, equipped in its rear part with openings 60 causing the opening 36 to communicate with the reaction chamber 35.

The operation is identical to that which was described earlier. Upon braking under normal conditions, the pressure prevailing in the interior volume V of the master cylinder is communicated to the reaction chamber 35 via the openings 36 and 60, so that it can be exerted on the cross-section S of the second part 52 and cause it to move backwards at the same time as the first part 50.

Upon emergency braking, the push rod 42 causes the second part 52 to advance. The hollow axial extension 58 therefore slides in the opening 36 until the openings 60 are closed off. The communication between the volume V of the master cylinder and the reaction chamber 35 is therefore interrupted, as the pressure prevailing inside the master cylinder is now exerted only on the cross-section $S_2$ of the second part 52 defined by the outside diameter of the extension 58.

When the driver releases his effort, the effect of re-established communication between the front and the rear chambers is to cause the moving partition 16 and the moving cylinder 32 to move back under the effect of the spring 25, and to cause the pressure in the interior volume V of the master cylinder to drop. On account of this drop in pressure and of the imperfect seal between the extension 58 and the opening 36, the second part 52 can move back enough to uncover the openings 60 and cause the reaction chamber 35 to communicate with the interior volume V of the master cylinder. The second part 52 can therefore move back under the action of the spring 54, and the various moving parts therefore return to their position of rest illustrated in FIG. 3.

The advantage of this alternative form lies in the fact that the cross-section $S_2$ can be defined more accurately than in the previous embodiment.

Figure 4:
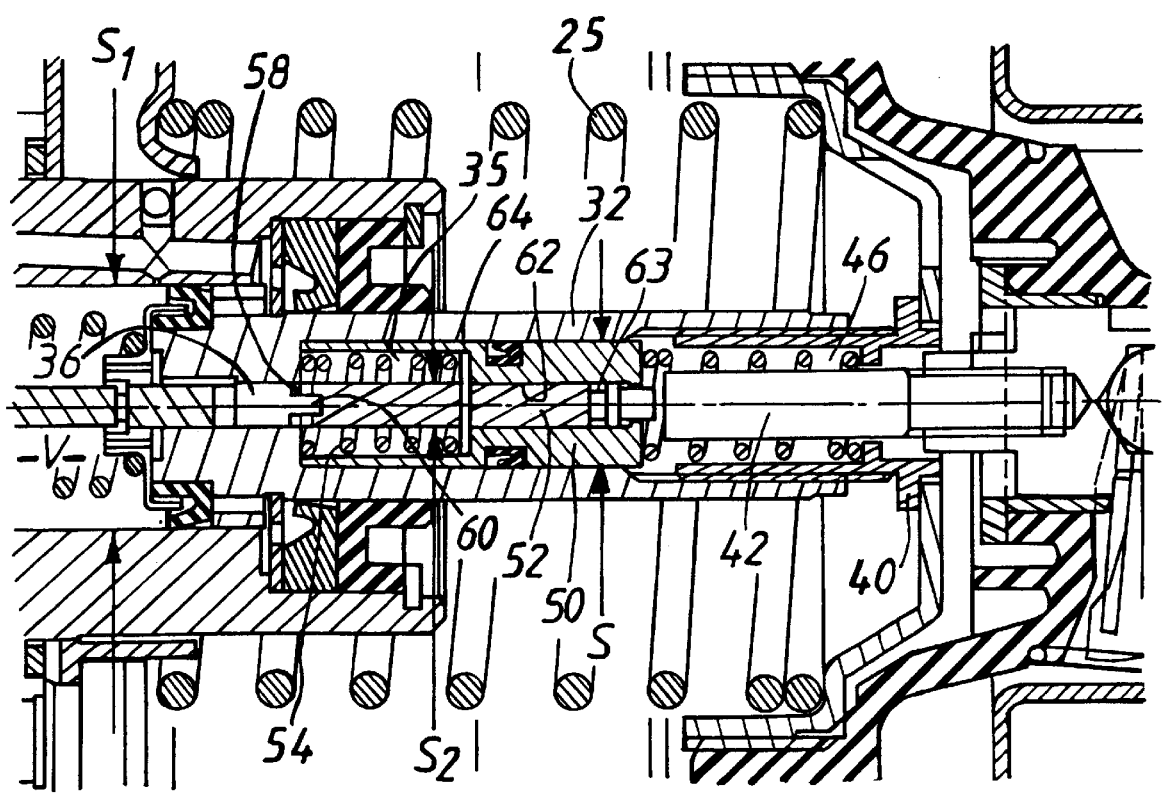
FIG. 4 represents a sectional view of a second alternative form of the central part of the braking device of FIG. 1.

According to the alternative form represented in FIG. 4, the first part 50 is in abutment towards the front on the end of the moving cylinder 32, and it is pierced with an axial bore 62 in which the second part 52 is capable of sliding in leaktight fashion thanks to an annular seal 63.

The second part 52 is of cylindrical overall shape and in its middle part includes a flange 64 coming into abutment towards the rear on the first part 50 under the effect of the urging of the spring 54.

As in the embodiment of FIG. 3, the second part 52 is formed at its front end with a hollow axial extension 58 sliding in almost leaktight fashion in the opening 36, and it is equipped at its rear part with openings 60 causing the opening 36 to communicate with the reaction chamber 35.

The operation is identical to that of the previous embodiments. Upon braking under normal conditions, the pressure prevailing in the interior volume V of the master cylinder is communicated to the reaction chamber 35 via the openings 36 and 60, to be exerted on the cross-section S of the first part 50 and cause it to move back at the same time as the second part 52 thanks to the leaktightness of the annular seal 63.

Upon emergency braking, the push rod 42 causes the second part 52 to advance. The hollow axial extension 58 therefore slides in the opening 36 until the openings 60 are closed off. The communication between the volume V of the master cylinder and the reaction chamber 35 is therefore interrupted, the pressure prevailing inside the master cylinder now being exerted only on the cross-section $S_2$ of the second part 52 defined by the outside diameter of the extension 58.

When the driver releases his effort, as in the previous embodiment, the effect of the backwards movement of the moving partition 16 and of the moving cylinder 32 under the effect of the spring 25 is to cause the pressure in the interior volume V of the master cylinder to drop. On account of this drop in pressure, and of the imperfect seal between the extension 58 and the opening 36, the second part 52 can move back sufficiently to uncover the openings 60 and make the reaction chamber 35 communicate with the interior volume V of the master cylinder. The second part 52 can therefore move back under the action of the spring 54, and the various moving parts therefore return to their position of rest illustrated in FIG. 4.

Figure 5:
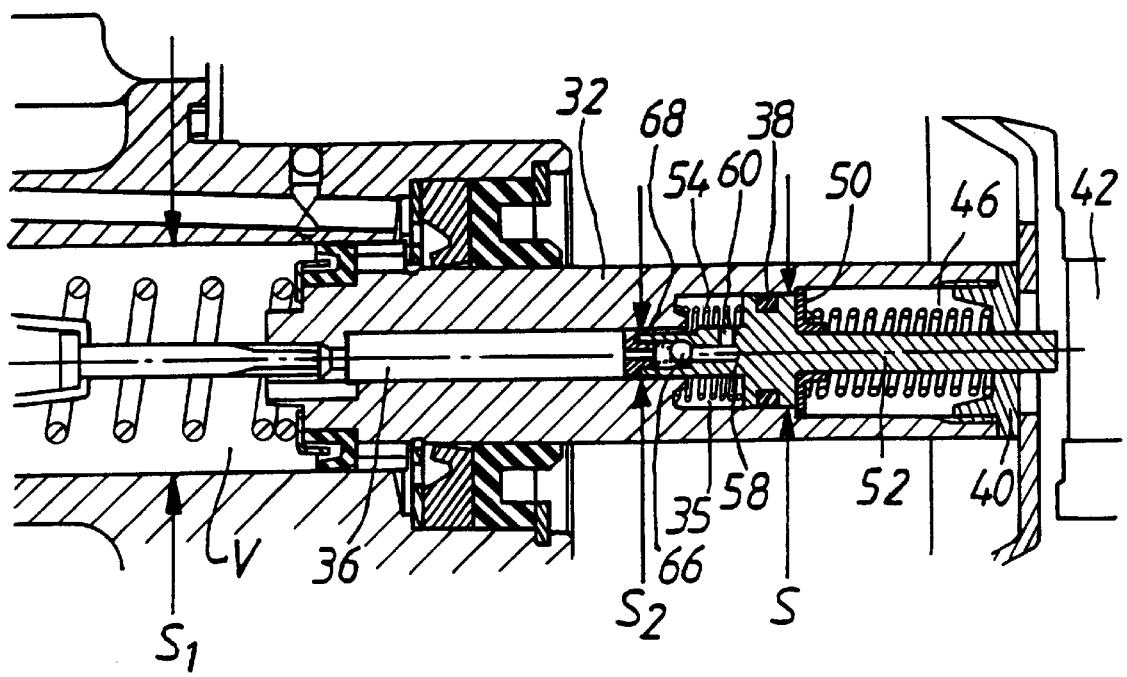
FIG. 5 represents a sectional view of a third alternative form of the central part of the braking device of FIG. 1.

According to the alternative form represented in FIG. 5, the first part 50 is a flange bearing on a radial shoulder of the moving cylinder 32 under the action of the spring 46. The second part 52 is capable of sliding in the first part 50 and in the moving cylinder 32 in a leaktight fashion thanks to the annular seal 38.

The second part 52 is also formed at its front end with the hollow axial extension 58 equipped at its rear part with openings 60 causing the opening 36 to communicate with the reaction chamber 35.

According to this alternative form, the axial extension 58 at its front end includes a non-return valve 66 allowing fluid to pass from the reaction chamber 35 towards the interior volume V of the master cylinder, but preventing fluid from passing in the other direction.

Furthermore, the axial extension 58 is formed with grooves or channels 68 over part of its length, these grooves or channels allowing, in the position represented in FIG. 5, unrestricted communication between the axial opening 36 and the reaction chamber 35. That part of the axial extension 58 which does not have channels 68, and which is situated behind these channels 68, slides in almost leaktight fashion in the opening 36.

The operation is similar to that of the previous embodiments. Upon braking under normal conditions, the pressure prevailing in the interior volume V of the master cylinder is communicated to the reaction chamber 35 via the opening 36, the channels 68 and the openings 60, to be exerted on the cross-section S of the second part 52 and cause it to move back at the same time as the first part 50, thus giving the desired reaction on the operating rod.

Upon emergency braking, the push rod 42 causes the second part 52 to advance. The hollow axial extension 58 therefore slides in the opening 36 until the grooves 68 lie completely in the opening 36. An additional forwards movement of the second part 52 is allowed thanks to the non-return valve 66, allowing fluid to flow from the reaction chamber 35 towards the interior volume V of the master cylinder.

As the communication of fluid from the volume V of the master cylinder towards the reaction chamber 35 is therefore interrupted, the pressure prevailing inside the master cylinder is now exerted only on the cross-section $S_2$ of the second part 52 defined by the outside diameter of the extension 58, as in the previous embodiments.

When the driver releases his effort, the pressure drops in the interior volume V of the master cylinder. On account of this drop of pressure, and of the imperfect seal between the extension 58 and the opening 36, the second part 52 can move back sufficiently to uncover the channels 68 and make the reaction chamber 35 communicate with the interior volume V of the master cylinder. The second part 52 can therefore move back under the action of the spring 54, and the various moving parts therefore return to their position of rest illustrated in FIG. 5.

Figure 6:
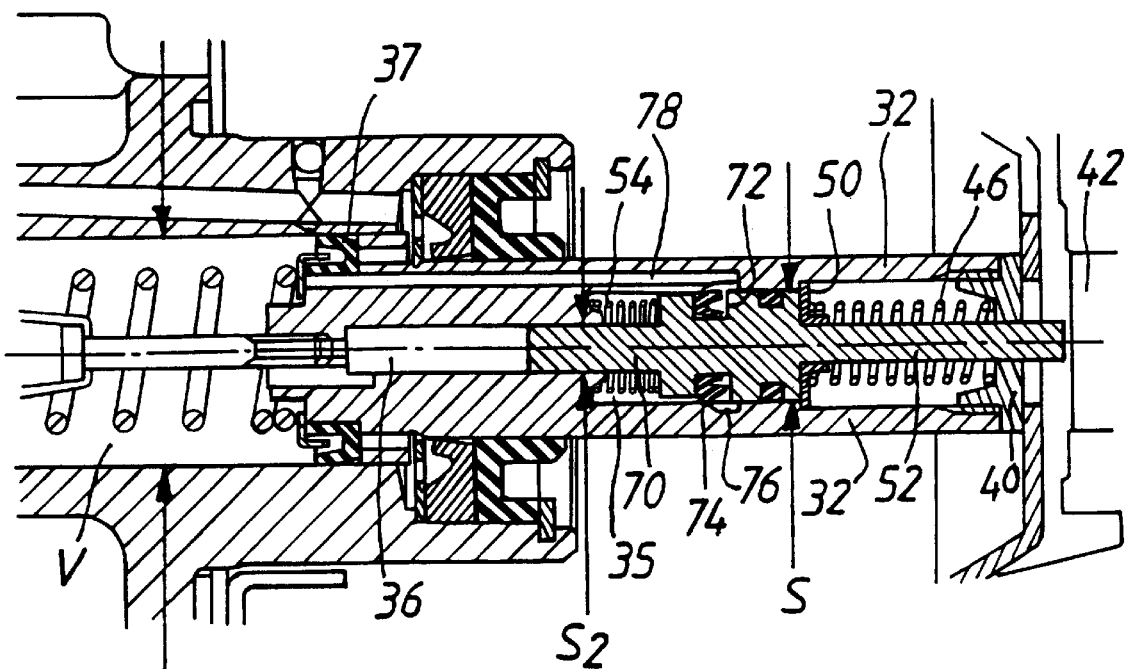
FIG. 6 represents a sectional view of a fourth alternative form of the central part of the braking device of FIG. 1.

According to the alternative form represented in FIG. 6, the first part 50 is, as in the previous embodiment, a flange bearing on a radial shoulder of the moving cylinder 32 under the action of the spring 46, and the second part 52 is capable of sliding in the first part 50 and in leaktight fashion in the moving cylinder 32 thanks to the annular seal 38.

The second part 52 is formed at its front end with an axial extension 70, this time consisting of a solid cylinder and sliding in almost leaktight fashion in the axial opening 36, in communication with the interior volume V of the master cylinder. The reaction chamber 35 is therefore of annular shape.

According to this alternative form, the second part 52 is formed with a peripheral groove 72 in which there is arranged a lip seal 74 of the same type as the lip seal 37 used in the master cylinder. The groove 72 is formed between the portion of the second part 52 sliding in leaktight fashion in the moving cylinder 32 and a front portion of substantially smaller diameter.

The moving cylinder 32 is also formed with an annular groove 76, in which there emerges a channel 78 formed in the moving cylinder 32 and communicating with the interior volume V of the master cylinder. In the position of rest represented in FIG. 6, the annular grooves 72 and 76 are substantially facing each other, which means that the lip seal 74 allows communication between the channel 78 and the reaction chamber 35.

Upon braking under normal conditions, the pressure prevailing in the interior volume V of the master cylinder is exerted on the one hand in the annular reaction chamber 35 via the channel 78 and the grooves 76 and 72 and, on the other hand, on the axial extension 70 of the second part 52, which means that it is exerted on the entire cross-section S of this second part 52. This pressure can therefore make this second part 52 move back at the same time as the first part 50, thus giving the desired reaction on the operating rod.

Upon emergency braking, the push rod 42 makes the second part 52 advance. The solid axial extension 70 therefore slides in the opening 36 until the lip seal 74 leaves the annular groove 76 and provides a perfect seal between the first and second parts 50 and 52. An additional forwards movement of the second part 52 is allowed thanks to the lip seal 74 acting as a non-return valve and allowing fluid to flow from the reaction chamber 35 towards the channel 78 and towards the interior volume V of the master cylinder.

As the fluid communication from the volume V of the master cylinder towards the annular reaction chamber 38 is therefore interrupted by the lip seal 74, preventing this communication, the pressure prevailing inside the master cylinder is now exerted only on the cross-section $S_2$ of the second part 52 defined by the outside diameter of the axial extension 70. The pressure communicated by the channel 78 to the groove 72 is exerted on the front and rear sides of this groove, and it therefore has no effect on the second part 52.

When the driver releases his effort, the pressure drops in the interior volume V of the master cylinder. On account of this drop in pressure, and of the imperfect seal between the extension 70 and the opening 36, the second part 52 can move back sufficiently to return the lip seal 74 to the groove 76 of the moving cylinder 32, and thus allow communication between the reaction chamber 35 and the interior volume V of the master cylinder. The second part 52 can therefore move back under the action of the spring 54, and the various moving parts therefore return to their position of rest illustrated in FIG. 6.

Figure 7:
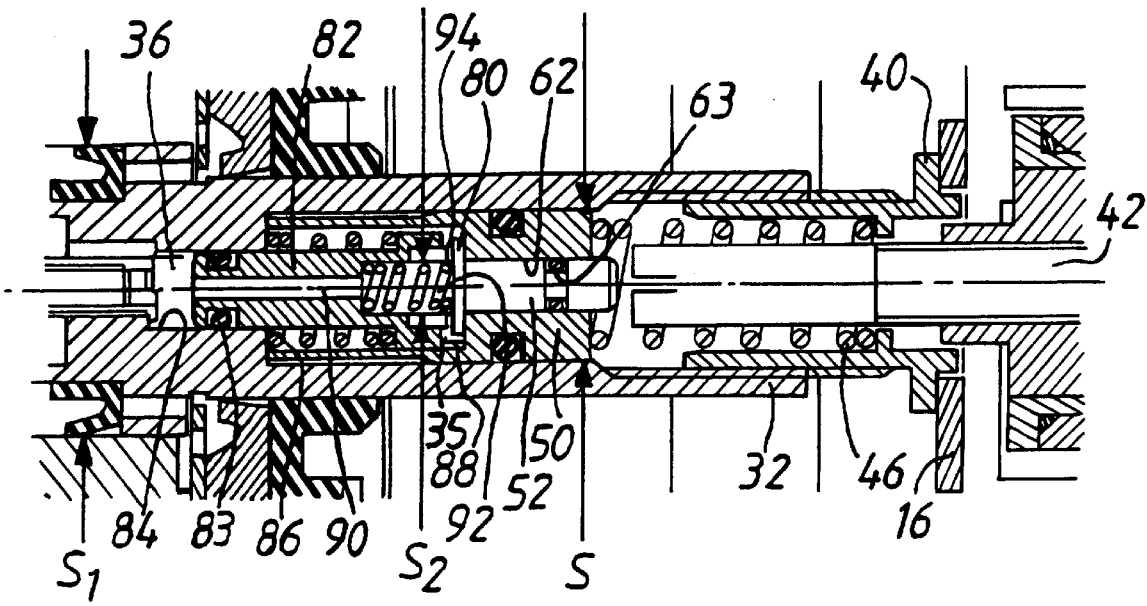
FIG. 7 represents a sectional view of a fifth alternative form of the central part of the braking device of FIG. 1.

The alternative form represented in FIG. 7 in fact constitutes an alternative form of the embodiment represented in FIG. 4. According to this last alternative form, the first part 50 is in abutment forwards on the end of the moving cylinder 32 and it is pierced with an axial bore 62 in which the second part 52 is capable of sliding in leaktight fashion thanks to an annular seal 63.

The second part 52 has a cylindrical overall shape and is secured at its front end to a disc 80 of outside diameter larger than that of the bore 62.

According to this alternative form, a third part 82 is formed by a piston 82 capable of sliding in leaktight fashion thanks to an annular seal 83 in a bore 84 of the moving cylinder 32. This third part 82 is urged backwards into a position of rest with a spring 86 so that it comes into backwards abutment, at rest, on the first part 50, via teeth or square-sided protrusions 88.

This third part 82 is formed with a central through-opening 90, which is stepped so as to form a shoulder against which a spring 92 bears, this spring also bearing on the disc 80 of the second part 52.

The preload at rest of the spring 86 is less than that of the spring 46, and the sum of the preloads at rest of the springs 86 and 92 is lower than that of the spring 46, so that the second part, when at rest, is in forwards abutment against the moving cylinder 32. In addition, the spring 92 has a lower stiffness than the spring 86.

According to this alternative form, the member for closing off the reaction chamber 35 consists of an annular seal 94 arranged on the second part 52 or, as has been represented, on the third part 82, around the rear end of the opening 90.

In operation, upon braking under normal conditions, the pressure prevailing in the interior volume V of the master cylinder is communicated to the reaction chamber 35 via the opening 90, to be exerted on the cross-section S of the first part 50 and make it move back at the same time as the second part 52 thanks to the leaktightness of the annular seal 63.

Upon emergency braking, the push rod 42 makes the second part 52 advance, and this second part therefore slides in the bore 62. As the spring 86 is stiffer than the spring 92, the latter compresses the first and allows the second part to come into contact with the third part, or more precisely with the annular seal 92. In so doing, the communication between the volume V of the master cylinder and the reaction chamber 35 is interrupted. The forwards movement of the second part/third part assembly is not limited because this assembly shifts in the reaction chamber which therefore has a constant volume.

As the reaction chamber 35 is isolated from the interior volume V of the master cylinder, the pressure prevailing inside the master cylinder is therefore now exerted only on the cross-section $S_2$ of the second part 52 defined by the inside diameter of the annular seal 94.

When the driver releases his effort, as in the previous embodiments, the backwards movement of the moving partition 16 and of the moving cylinder 32 has the effect of causing the pressure in the interior volume V of the master cylinder to drop.

At the same time, as the push rod 42 has moved back, the spring 86 can push the third part 82 backwards again until it comes into abutment on the first part 50, while the spring 92 can push the second part 52 back until it also comes into abutment on the first part 50.

The various moving parts therefore return to their position of rest illustrated in FIG. 7, and the reaction chamber 35 is again in communication with the interior volume of the master cylinder.

It can therefore be clearly seen that the various alternative forms which have just been explained make it possible to obtain the same advantages as the first embodiment, namely improved operating characteristics in the event of emergency braking. Each embodiment therefore has a boost ratio which is markedly higher than the one it has under normal operating conditions. The change of boost ratio is obtained automatically simply by exploiting the relative movement between the plunger 28 and the pneumatic piston 22. The various means used to obtain this result are relatively simple and therefore of lower cost and operate reliably under all circumstances, both under normal operating conditions and under emergency conditions.

Of course, those skilled in the art can make various modifications to the various embodiments which have been explained, without in any way departing from the scope of the invention as defined by the appended claims.

We claim:

1. A boosted braking device for a motor vehicle having a master cylinder filled with a brake fluid and equipped with a main hydraulic piston for receiving an actuation force composed of an input force and a boost force, said input force and boost force both acting in an axial direction; and a pneumatic booster operated by applying said input force to an operating rod secured to a plunger which controls a three-way valve, said booster exerting an actuating force on said main hydraulic piston, said booster including a rigid casting which is divided in a leaktight fashion into at least first and second chambers by means of at least one moving partition, said partition moving when acted on by a difference in pressure between said first and second chambers created by opening said three way valve to allow fluid under pressure to be commununicated to said second chamber, said difference in pressure driving a pneumatic piston within said casing to provide said boost force to said main hydraulic piston, said main hydraulic piston including a hollow cylinder having a first interior volume in communication with a second interior volume in said master cylinder, said hollow cylinder receiving at least a part of said boost force, a secondary hydraulic piston which slides in a leaktight fashion in an axial direction inside of said hollow cylinder, said secondary hydraulic piston receiving at least said input force, first elastic means exerting a first elastic force between said secondary hydraulic piston and said hollow cylinder for urging said secondary hydraulic piston toward said master cylinder, said hollow cylinder having at least a first opening through which said first interior volume is in communication with said second interior volume, said secondary hydraulic piston including a two-way valve means located between said first interior volume in said hollow cylinder and said second interior volume in said master cylinder, characterised: in that said secondary hydraulic piston is composite and includes a first part which in a rest position is in abutment against said hollow cylinder under the effect of said first elastic means and a second part capable of sliding with respect to said first part; in that a second elastic means exerts a second elastic force, in a second direction opposite said axial direction, which urges said second part into abutment with said first part in said position of rest; in that said two-way valve means, which is normally opened, is formed by said second part of said secondary hydraulic piston and a third part borne by said main hydraulic piston; and in that movement of said second part of said secondary hydraulic piston toward said master cylinder by said main hydraulic piston or with respect to said third part borne by said main hydraulic piston causes said two-way valve means to close and interrupt communication between said first interior volume in said hollow cylinder and said second interior volume in said master cylinder.

2. The boosted braking device according to claim 1, characterised in that said plunger is secured to a push rod for actuating said two-way valve means in a direction of closure upon a relative movement between said plunger and said moving partition, said relative movement corresponding to a variation greater than a predetermined value in said input force.

3. The boosted braking device according to claim 2, characterised in that said two-way valve means consist of an annular seal arranged on a front face of said second part adjacent said first opening in said hollow cylinder.

4. The boosted braking device according to claim 3, characterised in that a pressure of brake fluid in said second interior volume in said master cylinder is applied to a first cross-section of said second piston when said two-way valve means is opened and to a second cross-section of said secondary hydraulic piston when said two-way valve means is closed, said second cross-section being smaller than said first cross-section.

5. The boosted braking device according to claim 4, characterised in that said second cross-section is defined by an inside diameter of said annular seal on the front face of said second part.

6. The boosted braking device according to claim 2, characterised in that said two-way valve means is formed of a hollow axial extension of said second part, extending forward, with respect to said axial direction, and capable of sliding in an almost leaktight fashion in said first opening in said hollow cylinder and equipped at it's rear, with respect to said axial direction, with at least a second opening.

7. The boosted braking device according to claim 6, characterised in that a pressure of brake fluid in said second interior volume in said master cylinder is applied to a first cross-section of said second piston when said two-way valve means is opened and to a second cross-section of said secondary hydraulic piston when said two-way valve means is closed, said second cross-section being smaller than said first cross-section.

8. The boosted braking device according to claim 7, characterised in that said second cross-section is defined by an outside diameter of said axial extension of said second part.

9. The boosted braking device according to claim 2, characterised in that said second part is capable of sliding in a leaktight fashion in said first part; and in that said two-way valve means is formed by a hollow axial extension in said second part, extending forwards, with respect to said axial direction, sliding in an almost in said first opening in said hollow cylinder and equipped at its rear part with at least a second opening.

10. The boosted braking device according to claim 9, characterised in that a pressure of brake fluid in said second interior volume in said master cylinder is applied to a first cross-section of said second piston when said two-way valve means is opened and to a second cross-section of said secondary hydraulic piston when said two-way valve means is closed, said second cross-section being smaller than said first cross-section.

11. The boosted braking device according to claim 2, characterised in that said second part is formed with a hollow axial extension, equipped at its rear part, with respect to said axial direction, with at least a second opening; in that said two-way valve means is formed by at least one channel provided on an outside periphery and along part of a length of said hollow axial extension and which interacts selectively with an axial bore of said hollow cylinder; and in that said hollow axial extension contains a non-return valve which only allow fluid to pass from said first interior volume in said hollow cylinder toward said second interior volume in said master cylinder.

12. The boosted braking device according to claim 11, characterised in that a pressure of brake fluid in said second interior volume in said master cylinder is applied to a first cross-section of said second piston when said two-way valve means is opened and to a second cross-section of said secondary hydraulic piston when said two-way valve means is closed, said second cross-section being smaller than said first cross-section.

13. The boosted braking device according to claim 2, characterised in that said second part is formed with a solid axial extension capable of sliding in an almost leaktight fashion in said first opening in said hollow cylinder, said solid axial extension having a peripheral groove, said two-way valve means being formed by a lip seal arranged in said peripheral groove, said hollow cylinder having an annular groove in communication with said second interior volume in said master cylinder via a channel formed in said hollow cylinder, said peripheral groove and said annular groove lying substantially opposite one another in a rest position.

14. The boosted braking device according to claim 13, characterised in that a pressure of brake fluid in said second interior volume in said master cylinder is applied to a first cross-section of said second piston when said two-way valve means is opened and to a second cross-section of said secondary hydraulic piston when said two-way valve means is closed, said second cross-section being smaller than said first cross-section.

15. The boosted braking device according to claim 2, characterised in that said second part slides in a leaktight fashion in said first part; in that said third part slides in a leaktight fashion in said hollow cylinder, said third part being urged, in a second direction opposite said axial direction, by a third elastic means to that in a position of rest said third part abuts said first part, said second elastic means being arranged between said second part and said third part, said third part being formed with a central opening through which said first interior volume in said hollow cylinder communicates with said second interior volume in said master cylinder, said two-way valve means being formed by an annular seal arranged on one of said second or third parts.

16. The boosted braking device according to claim 15, characterised in that a pressure of brake fluid in said second interior volume in said master cylinder is applied to a first cross-section of said second piston when said two-way valve means is opened and to a second cross-section of said secondary hydraulic piston when said two-way valve means is closed, said second cross-section being smaller than said first cross-section.

17. The boosted braking device according to claim 16, characterised in that said second cross-section is defined by an inside diameter of said annular seal arranged on one of said second or third parts.

18. The boosted braking device according to claim 1, characterised in a buffer piece made of an elastomeric material located between said second part and said plunger.

19. The boosted braking device according to claim 2, characterised in that a value for the variation in an input force corresponds to a predetermined value to a braking action under emergency conditions.

* * * * *